US012802230B2

(12) United States Patent
Agarwal et al.

(10) Patent No.: US 12,802,230 B2
(45) Date of Patent: Nov. 17, 2026

(54) DECOMPOSING A RASTER IMAGE INTO CONSTITUENT ELEMENTS UTILIZING DISCRETE LAYERING AND CLASSIFICATION

(71) Applicant: Adobe Inc., San Jose, CA (US)

(72) Inventors: Aishwarya Agarwal, Bengaluru (IN); Joseph Koonthanam Jose, Kottayam (IN); Karthik Viswanathan, Abu Dhabi (AE); Balaji Vasan Srinivasan, Bangalore (IN); Dev Sandip Shah, Jamnagar (IN); Mandar Rameshwar Wayal, Aurangabad (IN)

(73) Assignee: Adobe Inc., San Jose, CA (US)

( * ) Notice: Subject to any disclaimer, the term of this patent is extended or adjusted under 35 U.S.C. 154(b) by 210 days.

(21) Appl. No.: 18/804,890

(22) Filed: Aug. 14, 2024

(65) Prior Publication Data

US 2026/0051064 A1 Feb. 19, 2026

(51) Int. Cl.

| | |
|---|---|
| ***G06T 7/10*** | (2017.01) |
| ***G06T 5/77*** | (2024.01) |
| ***G06T 7/50*** | (2017.01) |
| ***G06V 10/25*** | (2022.01) |
| ***G06V 10/764*** | (2022.01) |

(52) U.S. Cl.

CPC .................. *G06T 7/10* (2017.01); *G06T 5/77* (2024.01); *G06T 7/50* (2017.01); *G06V 10/25* (2022.01); *G06V 10/764* (2022.01); *G06T 2207/20084* (2013.01)

(58) Field of Classification Search

CPC .... G06T 7/10; G06T 5/77; G06T 7/50; G06T 2207/20084; G06T 7/11; G06V 10/25; G06V 10/764; G06V 10/82

See application file for complete search history.

(56) References Cited

U.S. PATENT DOCUMENTS

| | | | | |
|---|---|---|---|---|
| 2021/0124774 | A1* | 4/2021 | Bedi | G06F 16/538 |
| 2023/0368339 | A1 | 11/2023 | Zheng et al. | |
| 2024/0037717 | A1 | 2/2024 | Amirghodsi et al. | |
| 2024/0403543 | A1 | 12/2024 | Singh | |

(Continued)

OTHER PUBLICATIONS

Combined Search and Examination Report as received in United Kingdom Application No. 2502070.2 dated Sep. 10, 2025.

(Continued)

*Primary Examiner* — Jonathan A Boyd

(74) *Attorney, Agent, or Firm* — Keller Preece PLLC

(57) ABSTRACT

The present disclosure relates to systems, non-transitory computer-readable media, and methods for decomposing a raster design into constituent elements. In particular, the disclosed systems determine, utilizing a plurality of segmentation neural networks, a set of layers corresponding to different depths of a digital image, each layer comprising non-overlapping design elements. In addition, the disclosed systems generate, utilizing the plurality of segmentation neural networks, segmentation masks for the digital image by decomposing the digital image into the design elements within the set of layers. Moreover, the disclosed systems provide, for display via a graphical user interface of a client device, the digital image with the design elements within the set of layers according to the segmentation masks.

20 Claims, 12 Drawing Sheets

(56) References Cited

U.S. PATENT DOCUMENTS

2025/0086896 A1* 3/2025 Litany ..................... G06T 19/20

OTHER PUBLICATIONS

Alexander Kirillov, Eric Mintun, Nikhila Ravi, Hanzi Mao, Chloe Rolland, Laura Gustafson, Tete Xiao, Spencer Whitehead, Alexander C. Berg, Wan-Yen Lo, Piotr Dollar, and Ross Girshick, "Segment Anything." 30 pages, arXiv preprint arXiv:2304.02643v1, Apr. 5, 2023.

Céline Mougenot, Carole Bouchard, Amezaine Aoussat, and Steve Westerman, "Inspiration, Images and Design: an investigation of designers' information gathering strategies", Journal of Design Research, 7(4), 331-351, Jan. 2008.

Joesph Redmon and Ali Farhadi, "YOLO9000: Better, Faster, Stronger", 2017 IEEE Conference on Computer Vision and Pattern Recognition (CVPR), pp. 6517-6525, (Jul. 2017). [Online]. Available: https://doi.org/10.1109/CVPR.2017.690.

Kaiming He, Georgia Gkioxari, Piotr Dollar, and Ross Girshick, "Maskr-CNN", In Proceedings of the IEEE International Conference on Computer Vision (ICCV), pp. 2980-2988, (2017) [Online]. Available: doi: 10.1109/ICCV.2017.322.

Olaf Ronneberger, Philipp Fischer, and Thomas Brox. 2015. U-net: Convolutional networks for biomedical image segmentation. In International Conference on Medical image computing and computer-assisted intervention. Lecture Notes in Computer Science(), vol. 9351. Springer, Cham. Nov. 18, 2015. https://doi.org/10.1007/978-3-319-24574-4_28.

Roman Suvorov, Elizabeth Logacheva, Anton Mashikkin, Anastasia Remizova Arsenii Ashuha et al., "Resolution-robust Large Mask Inpainting with Fourier Convolutions", Proceedings of the IEEE/CVF Winter Conference on Applications of Computer Vision, pp. 2149-2159 (2022).

Shaoqing Ren, Kaming He, Ross Girschick, and Jain Sun, "Faster R-CNN: Towards Real-Time Object Detection with Region Proposal Networks", arXiv preprint arXiv:1506.01497, Jun. 4, 2015.

Shilong Liu, Zhaoyang Zeng, Tianhe Ren, Feng Li, Hao Zhang, Jie Yang, Qing Jiang, et al., "Grounding DINO: Marrying DINO with Grounded Pre-Training for Open-Set Object Detection." 17 pages, arXiv preprint arXiv:2303.05499, Mar. 20, 2023.

Sreekanth Vempati, Korah T Malayil, Vayllada Sruthi, and Sandeep Sandeep, "Enabling Hyper-Personalization: Automated Ad Creative Generation and Ranking for Fashion E-Commerce". 10 pages, arXiv preprint arXiv:1908.10139v1, Aug. 27, 2019.

Vijay Badrinarayanan, Alex Kendall, and Roberto Cipolla. "SegNet: A Deep Convolutional Encoder-Decoder Architecture for Image Segmentation", IEEE Transactions on Pattern Analysis and Machine Intelligence, 39.12: 2481-2495, Dec 2017.

Yanhong Zeng, Jianlong Fu, Hongyang Chao, and Baining Guo, "Aggregated Contextual Transformations for High-resolution image inpainting", IEEE Transactions on Visualization and Computer Graphics, 29(7), 3266-3280 (2022).

Office Action as received in German application No. 10 2025 118 992.7 dated Jan. 15, 2026.

Office Action as received in German application No. 10 2025 118 992.7 dated Nov. 20, 2025.

* cited by examiner

DECOMPOSING A RASTER IMAGE INTO CONSTITUENT ELEMENTS UTILIZING DISCRETE LAYERING AND CLASSIFICATION

BACKGROUND

Object segmentation for digital images is an important task in the field of computer vision. As object segmentation has become more prevalent for creation and editing of digital images, a need has arisen for segmenting design elements depicted in digital images. In particular, digital images with design elements (e.g., digital images used for marketing content, instructional materials, flyers, or other graphic design implementations) often have design elements on multiple layers at different depths. Moreover, these digital images often are in a raster format, in which layer information is not readily retrievable for a digital image. Thus, accurately identifying distinct elements while also providing such elements for downstream operations in graphical user interfaces for users is an important and challenging aspect of digital design systems. However, existing systems struggle to accurately and flexibly segment design images in a usable format, which increases the difficulty and complexity of using the segmented design images in downstream operations.

BRIEF SUMMARY

Embodiments of the present disclosure provide benefits and/or solve one or more problems in the art with systems, non-transitory computer-readable media, and methods for decomposing raster images into constituent elements utilizing discrete layering and classification. In particular, in some embodiments, the disclosed systems generate segmentation masks for a digital image by decomposing the digital image into design elements within a set of layers. For example, in some implementations, the disclosed systems utilize segmentation neural networks to determine the set of layers corresponding to different depths of the digital image. Moreover, in some embodiments, the disclosed systems determine classifications for the segmentation masks that indicate design element types. Furthermore, in some implementations, the disclosed systems inpaint regions within various layers that have gaps from segmented design elements. Additionally, in some embodiments, the disclosed systems provide the inpainted layers with the digital image for display via a graphical user interface.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
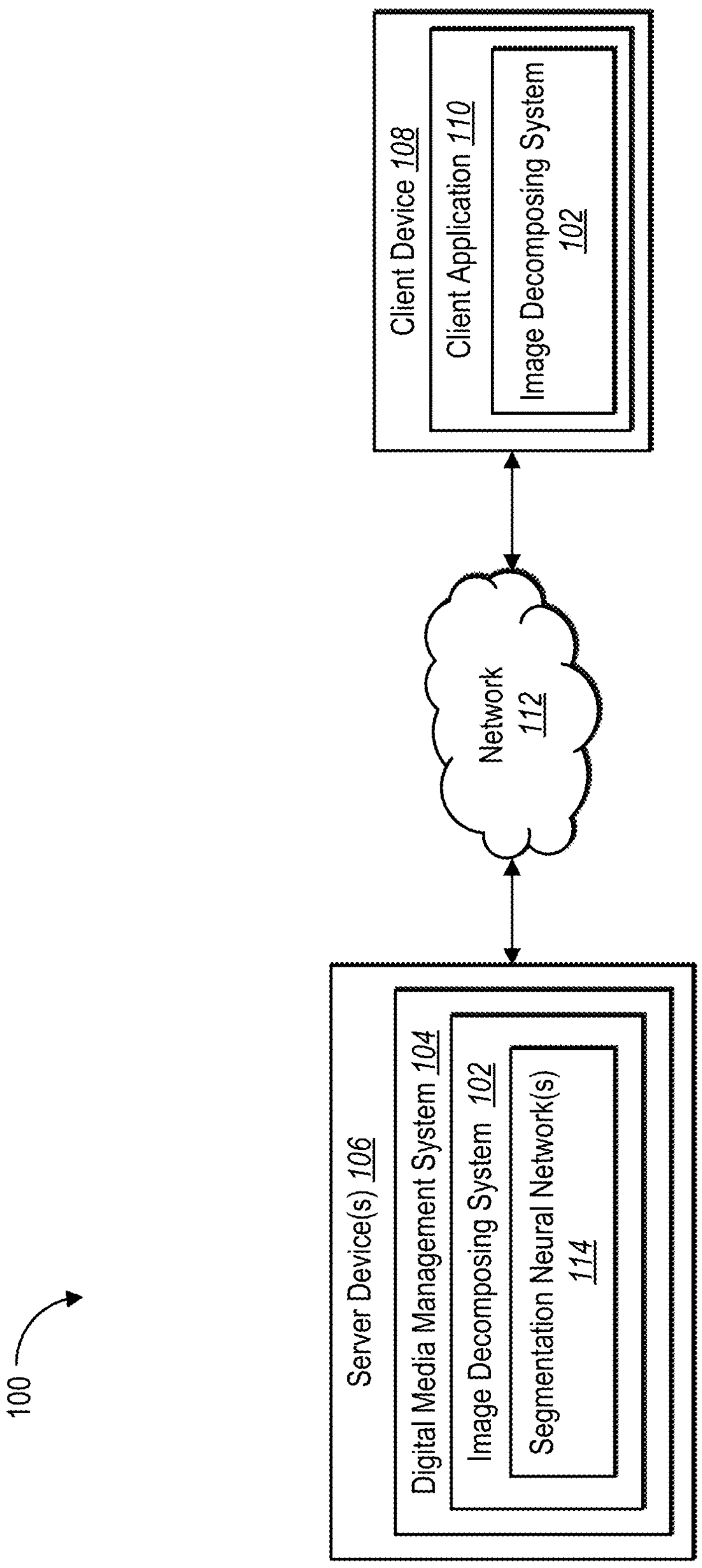
FIG. 1 illustrates a diagram of an environment in which an image decomposing system operates in accordance with one or more embodiments.

This disclosure describes one or more embodiments of an image decomposing system that decomposes digital images into constituent design elements within discrete layers. In particular, in some embodiments, the image decomposing system generates segmentation masks for a digital image by decomposing the digital image into design elements within a set of layers. For example, the image decomposing system utilizes one or more segmentation neural networks to determine the set of layers corresponding to different depths of design elements within the digital image. Moreover, in some embodiments, the image decomposing system determines classifications indicating design element types for the segmentation masks. Furthermore, in some implementations, the image decomposing system inpaints regions within the layers that have gaps from segmented design elements in higher-level layers. Additionally, in some embodiments, the image decomposing system provides the inpainted layers for display with the digital image via a graphical user interface.

To illustrate one or more embodiments, the image decomposing system extracts components of a raster image along with layering information, thereby enabling seamless editing of the components (e.g., design elements). More particularly, given an input design image, the image decomposing system decomposes the design image into its constituent atomic design elements. For each design element, the image decomposing system classifies the design element with a corresponding class label (e.g., shape, frame, text, image, background, etc.).

To further illustrate, in some implementations, the image decomposing system generates layer masks for an image using one or more layer segmentation neural networks. The image decomposing system then constructs bounding boxes around the layer masks and parses them as prompts through a finetuned segmentation neural network to obtain individual design element masks. The image decomposing system sequentially processes the design element masks through an inpainting model. For example, the design elements belonging to the most foreground layer get inpainted first. The image decomposing system continues to inpaint design element masks until all layers have been extracted and inpainted.

More particularly, in some implementations, the image decomposing system decomposes a design image into corresponding layers comprising design elements. In one or more embodiments, a design image is a digital image with multiple layers, in which each layer has a set of one or more non-overlapping design elements (e.g., corresponding to different depths). For example, the design elements belong to different sequential layers that each have at least one design element. In some cases, the layers create a chain of overlaps with at least one element of the other layers based on the corresponding depths. The image decomposing system segments each of the layers from a design image using benchmark models in one shot, and then extracts atomic segmentation masks which are applied to the design image to obtain atomic design elements. Furthermore, in some implementations, the image decomposing system inpaints the layers sequentially by considering the ordering of various elements in terms of their layer masks.

As mentioned, in some embodiments, the image decomposing system utilizes segmentation neural networks to extract layers and generate segmentation masks for a design image. More particularly, in some implementations, the image decomposing system improves upon existing segmentation neural networks, as explained in additional detail below. In some embodiments, the image decomposing system improves upon a promptable image segmentation model (e.g., as described by Kirillov, et al. in *Segment Anything*, at arXiv:2304.02643 (2023)). This model has three main components: a pre-trained image encoder, a pre-trained prompt encoder, and a mask decoder. The prompt encoder and the image encoder generate, respectively, prompt embeddings and image embeddings. The prompt embeddings are concatenated with learnable tokens corresponding to each of the different masks obtained from the output of the model (e.g., multimask outputs). The mask decoder has two transformer blocks, with each transformer block having a self-attention block for prompt tokens, a cross-image-to-token-attention block for the image embeddings, a multilayer perceptron layer for the updated prompt tokens, and a cross-token-to-image-attention block for updated prompt embeddings to attend on the image embeddings. The image tokens are upscaled into low-resolution masks. The low-resolution masks are generated by point-wise multiplication of spliced prompt embeddings and the upscaled image tokens. The low-resolution masks are then transformed into the shape of the image and converted into binary segmentation masks.

In one or more embodiments, an image embedding includes a numerical representation of features of an image (e.g., features and/or pixels of a digital image). For instance, in some cases, an image embedding includes a vector representation of a digital image. To illustrate, an image embedding includes a latent feature vector representation of a digital image generated by one or more layers of a neural network. In one or more embodiments, a prompt embedding includes a numerical representation of an image prompt. For example, a prompt embedding includes spatial information about a prompt (e.g., a bounding box, a grid, a lasso selection, etc.) in relation to features of an image.

To give more particular detail of the attention blocks, the mask decoder includes various attention modules that attend to the prompt tokens and the image tokens. Specifically, in the cross-image-to-token-attention block, the updated prompt tokens attend to the image embeddings. The cross-token-to-image attention block employs a query as the prompt tokens, a key as the image tokens, and a value as the image tokens. The query and key are projected into the internal dimensions, and the projected query and key values are separated into heads. A point-wise multiplication is performed between head-separated queries and keys to obtain the attention heads. The attention heads are combined and a point-wise multiplication is performed between the values and the combined attention heads. The query projections are extracted, interpolated, and upscaled. Low-resolution masks are then generated by performing a matrix multiplication of the interim upscaled tokens with the updated prompt tokens.

As mentioned, and as described in detail below, in some implementations, the image decomposing system changes and improves upon this model to decompose design images into layers of design elements.

Although existing systems segment objects within a digital image, such systems have a number of problems in relation to flexibility of operation and accuracy. For instance, existing systems often are unable to decompose design images into their constituent design elements. Specifically, existing segmentation systems often fail to distinguish between design elements and objects within a design element. For example, existing systems segment multiple objects portrayed in a background image in a design, even though the background image is a single composite element in the design (e.g., by segmenting individual text characters in a word as separate segmented objects). As another example, existing systems often do not recognize layering information in an image, and thus are unable to extract design elements layer-by-layer.

The image decomposing system provides a variety of technical advantages relative to existing systems. For example, by focusing attention of one or more segmentation neural networks on depth information in a design image, the image decomposing system provides technical capability to extract layered segmentation masks. Thus, the image decomposing system decomposes design images into layers of design elements, thereby providing functionality of decomposing raster designs into constituent layers of design elements.

Moreover, in some embodiments, the image decomposing system segments the layers in one shot, thereby overcoming the challenge that existing systems face of compounding losses combined with time-taking extraction. For instance, the image decomposing system segments the layers all at once, and simultaneously extracts individual segmentation masks from the layer masks. In this way, the image decomposing system enhances accuracy over existing systems for segmenting elements from a design image.

Additional detail will now be provided in relation to illustrative figures portraying example embodiments and implementations of an image decomposing system. For example, FIG. 1 illustrates a system 100 (or environment) in which an image decomposing system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a digital media management system 104 that further includes the image decomposing system 102. In some embodiments, the image decomposing system 102 utilizes segmentation neural network(s) 114 to decompose a digital image. For example, in some implementations, the image decomposing system 102 utilizes the segmentation neural network(s) 114 to determine layers of the digital image and/or to generate segmentation masks for the digital image. In some embodiments, the server device(s) 106 includes, but is not limited to, a computing device (such as explained below with reference to FIG. 12).

A machine learning model includes a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a diffusion neural network, a recurrent neural network (e.g., an LSTM), a graph neural network, a transformer, or a generative adversarial neural network.

In some instances, the image decomposing system 102 receives a request (e.g., from the client device 108) to decompose a digital image. For example, the image decomposing system 102 obtains the digital image and receives a request to separate elements (e.g., design elements) of the digital image (e.g., for use in a downstream task, such as a new graphic design). Some embodiments of server device(s) 106 perform a variety of functions via the digital media management system 104 on the server device(s) 106. To illustrate, the server device(s) 106 (through the image decomposing system 102 on the digital media management system 104) performs functions such as, but not limited to, determining a set of layers of design elements corresponding to different depths of a digital image, generating segmentation masks for the digital image by decomposing the digital image into the design elements within the set of layers, and providing the digital image for display with the design elements within the set of layers. In some embodiments, the server device(s) 106 utilizes the segmentation neural network(s) 114 to determine the set of layers and/or generate the segmentation masks. In some embodiments, the server device(s) 106 trains the segmentation neural network(s) 114.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 12. Some embodiments of client device 108 perform a variety of functions via a client application 110 on client device 108. For example, the client device 108 (through the client application 110) performs functions such as, but not limited to, determining a set of layers of design elements corresponding to different depths of a digital image, generating segmentation masks for the digital image by decomposing the digital image into the design elements within the set of layers, and providing the digital image for display with the design elements within the set of layers. In some embodiments, the client device 108 utilizes the segmentation neural network(s) 114 to determine the set of layers and/or generate the segmentation masks. In some embodiments, the client device 108 trains the segmentation neural network(s) 114.

To access the functionalities of the image decomposing system 102 (as described above and in greater detail below), in one or more embodiments, a user interacts with the client application 110 on the client device 108. For example, the client application 110 includes one or more software applications (e.g., to decompose design elements within digital images in accordance with one or more embodiments described herein) installed on the client device 108, such as a digital media management application and/or an image editing application. In certain instances, the client application 110 is hosted on the server device(s) 106. Additionally, when hosted on the server device(s) 106, the client application 110 is accessed by the client device 108 through a web browser and/or another online interfacing platform and/or tool. Furthermore, in some embodiments, the client device 108, the server device(s) 106, or another system host one or more databases including digital data.

As illustrated in FIG. 1, in some embodiments, the image decomposing system 102 is hosted by the client application 110 on the client device 108 (e.g., additionally, or alternatively to being hosted by the digital media management system 104 on the server device(s) 106). For example, the image decomposing system 102 performs the decomposing techniques described herein on the client device 108. In some implementations, the image decomposing system 102 utilizes the server device(s) 106 to train and implement machine learning models (such as the segmentation neural network(s) 114). In one or more embodiments, the image decomposing system 102 utilizes the server device(s) 106 to train machine learning models (such as the segmentation neural network(s) 114) and utilizes the client device 108 to implement or apply the machine learning models.

Further, although FIG. 1 illustrates the image decomposing system 102 being implemented by a particular component and/or device within the system 100 (e.g., the server device(s) 106 and/or the client device 108), in some embodiments the image decomposing system 102 is implemented, in whole or in part, by other computing devices and/or components in the system 100. For instance, in some embodiments, the image decomposing system 102 is implemented on another client device. More specifically, in one or more embodiments, the description of (and acts performed by) the image decomposing system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a request to decompose a digital image into layers of constituent design elements). In response, the image decomposing system 102 on the server device(s) 106 performs operations described herein to utilize the segmentation neural network(s) 114 to decompose the digital image. The server device(s) 106 provides the output or results of the operations (e.g., segmentation masks within layers of the digital image, inpainted layers of the digital image, etc.) to the client device 108. As another example, in some implementations, the image decomposing system 102 on the client device 108 performs operations described herein to utilize the segmentation neural network(s) 114 to decompose the digital image. The client device 108 provides the output or results of the operations (e.g., segmentation masks within layers of the digital image, inpainted layers of the digital image, etc.) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and communicates using any communication platforms and technologies suitable for transporting data and/or communication signals, examples of which are described with reference to FIG. 12. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As mentioned, in some embodiments, the image decomposing system 102 segments design elements of a digital image into constituent layers. For instance, FIG. 2 illustrates the image decomposing system 102 utilizing segmentation neural networks to generate layers of design elements for a digital image in accordance with one or more embodiments.

Figure 2:
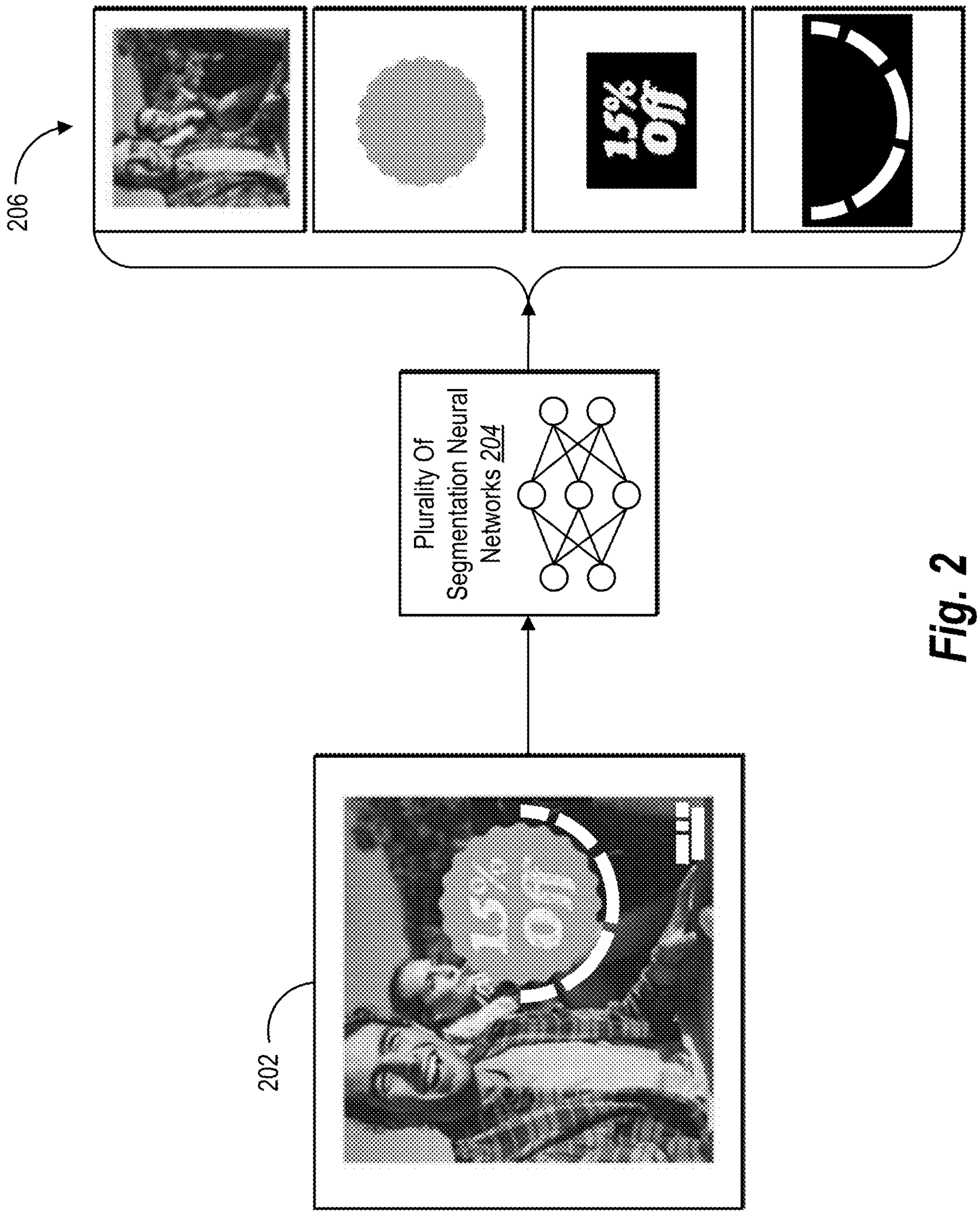
FIG. 2 illustrates the image decomposing system utilizing segmentation neural networks to generate layers of design elements for a digital image in accordance with one or more embodiments.

Specifically, FIG. 2 shows the image decomposing system 102 obtaining a digital image 202 (e.g., a design image, including design elements). The image decomposing system 102 processes the digital image 202 through a plurality of segmentation neural networks 204 (e.g., the segmentation neural network(s) 114) to segment constituent design elements in layers of the digital image 202. Moreover, the image decomposing system 102 inpaints the layers (e.g., to fill in gaps left by segmented design elements of higher-level layers) to generate inpainted layers 206 for display with the digital image 202. Design elements include backgrounds, frames, shapes, texts, colors, lines, textures, spaces, sizes, forms, patterns and/or other elements that make up a design image.

As described in additional detail below, in some embodiments, the image decomposing system 102 utilizes the plurality of segmentation neural networks 204 to determine one or more sets of layers of design elements corresponding to different depths of the digital image 202. For instance, the image decomposing system 102 utilizes a first segmentation neural network to determine a predetermined number (e.g., two, three, four, five, or more) of layers of design elements at similar depths, in which the design elements in a given layer do not overlap each other (i.e., the design elements in the layer are non-overlapping). For example, as illustrated in FIG. 2, the image decomposing system 102 utilizes the first segmentation neural network to determine a first layer containing a background image in the digital image 202 at a first depth, a second layer containing a shape over the background image at a second depth, a third layer containing text over the shape at a third depth, and a fourth layer containing text over the background image at a fourth depth. Accordingly, each layer includes a set of design elements detected at a single depth in relation to other design elements of a digital image.

Additionally, in some embodiments, the image decomposing system 102 utilizes the plurality of segmentation neural networks 204 to generate segmentation masks for the digital image 202. For example, the image decomposing system 102 segments, within each layer in the set(s) of layers, the design elements into binary masks. Thus, the image decomposing system 102 decomposes the digital image 202 into its constituent design elements layer-by-layer.

Moreover, in some implementations, the image decomposing system 102 classifies the segmented elements. For instance, the image decomposing system 102 determines a design element classification that indicates a type of design element (e.g., background, shape, text, etc.) for each segmentation mask to use in establishing layer attributes. Furthermore, in some embodiments, the image decomposing system 102 inpaints portions of the digital image 202 (e.g., in regions covered by segmented elements of higher layers) to generate one or more inpainted digital images from the digital image 202. In addition, in some embodiments, the image decomposing system 102 provides the inpainted digital images (e.g., with the original digital image 202) for display via a graphical user interface on a client device.

As discussed, in some embodiments, the image decomposing system 102 utilizes segmentation neural networks to generate segmentation masks for design elements. For instance, FIG. 3 illustrates the image decomposing system 102 utilizing segmentation neural networks to determine design layers and generate segmentation masks for decomposing a raster design image in accordance with one or more embodiments.

Figure 3:
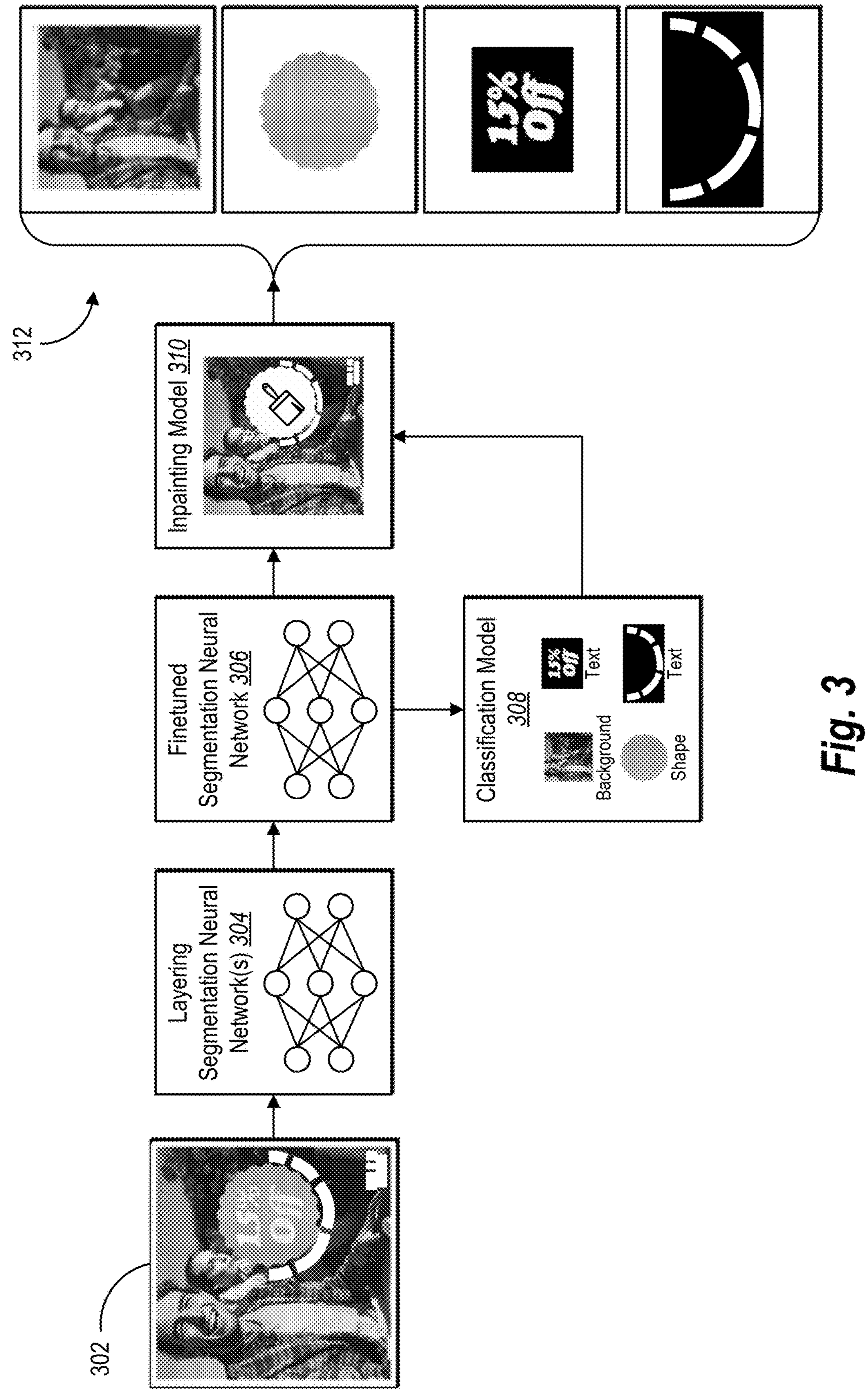
FIG. 3 illustrates the image decomposing system utilizing segmentation neural networks to determine design layers and generate segmentation masks for decomposing a raster design image in accordance with one or more embodiments.

Specifically, FIG. 3 shows the image decomposing system 102 obtaining a digital image 302 that includes design elements. Additionally, as shown in FIG. 3, the image decomposing system 102 processes the digital image 302 through one or more layering segmentation neural networks. For example, the image decomposing system 102 generates layer masks for the digital image 302 utilizing layering segmentation neural network(s) 304. To illustrate, the image decomposing system 102 determines a set of layer masks for design elements corresponding to different depths of the digital image 302. Moreover, in some embodiments, the image decomposing system 102 determines bounding boxes for the set of layer masks according to the design elements. As described with additional detail below in connection with FIG. 5, in some embodiments, the image decomposing system 102 utilizes one or more of a naïve layer segmentation neural network, an attention-modulated layer segmentation neural network, or a self-attention-and-cross-attention-modulated layer segmentation neural network to determine layer masks for digital images.

Moreover, FIG. 3 shows the image decomposing system 102 utilizing a fine-tuned segmentation neural network. For instance, the image decomposing system 102 processes the layer masks and bounding boxes through finetuned segmentation neural network 306 to generate segmentation masks for the design elements of the digital image 302. In some implementations, the image decomposing system 102 trains the finetuned segmentation neural network 306 utilizing design element training datapoints. For example, and as described in additional detail below in connection with FIG. 6, the image decomposing system 102 finetunes a segmentation neural network with design element training data to differentiate between real-world images and design elements in design images.

Furthermore, in some implementations, the image decomposing system 102 determines classifications for the design elements of the digital image 302. For example, as described in additional detail below in connection with FIG. 4, the image decomposing system 102 utilizes classification model 308 to determine design element classifications for the segmentation masks to use in determining content-type attributes for the resulting layers. A design element classification includes an indication of a type of design element (e.g., a background, shape, frame, text, etc.). Furthermore, in some implementations, the image decomposing system 102 provides the design element classifications with the layers of design elements for display via a graphical user interface.

In addition, in some embodiments, the image decomposing system 102 inpaints regions of various layers of the digital image 302. For example, the image decomposing system 102 inpaints a region of a layer of the set of layers, the region corresponding to a segmentation mask on the layer of the set of layers. To illustrate, the image decomposing system 102 utilizes inpainting model 310 to fill in gaps left from segmenting design elements of the digital image. For instance, the digital image 302 shown has a wavy-round shape that, when segmented from the digital image 302, leaves a gap in the digital image. The image decomposing system 102 utilizes the inpainting model 310 to generate replacement pixels for the digital image (e.g., for lower-level layers in the digital image than the layer with the wavy-round shape). In some embodiments, the image decomposing system 102 utilizes the inpainting model as described in U.S. patent application Ser. No. 17/663,317, filed May 13, 2022, titled "OBJECT CLASS INPAINTING IN DIGITAL IMAGES UTILIZING CLASS-SPECIFIC INPAINTING NEURAL NETWORKS," or as described in U.S. patent application Ser. No. 17/815,409, filed Jul. 27, 2022, titled "GENERATING NEURAL NETWORK BASED PERCEPTUAL ARTIFACT SEGMENTATIONS IN MODIFIED PORTIONS OF A DIGITAL IMAGE," each of which are incorporated by reference herein in their entireties.

Moreover, in some implementations, the image decomposing system 102 sequentially inpaints regions of the digital image corresponding to the segmentation masks according to an order of layers of the set of layers. For example, the image decomposing system 102 first inpaints a second-highest layer beneath the first layer with design elements segmented, then inpaints a third-highest layer to replace pixels missing from the design elements segmented in the second-highest layer, and continues in this fashion with lower-level layers until it inpaints the lowest-level layer. By inpainting the regions of the digital image by layer, the image decomposing system 102 avoids introducing artifacts that typically occur in iterative inpainting processes via conventional inpainting systems.

As further shown in FIG. 3, in some implementations, the image decomposing system 102 generates inpainted layers 312. In some embodiments, the image decomposing system 102 provides the inpainted layers 312 for display via a graphical user interface of a client device, by which a user views and considers the inpainted layers 312 for use in a downstream task, such as creating a new design image.

As mentioned, in some embodiments, the image decomposing system 102 classifies individual component masks for a digital image. For instance, FIG. 4 illustrates the image decomposing system 102 generating segmentation masks and classifying the segmentation masks in accordance with one or more embodiments.

Figure 4:
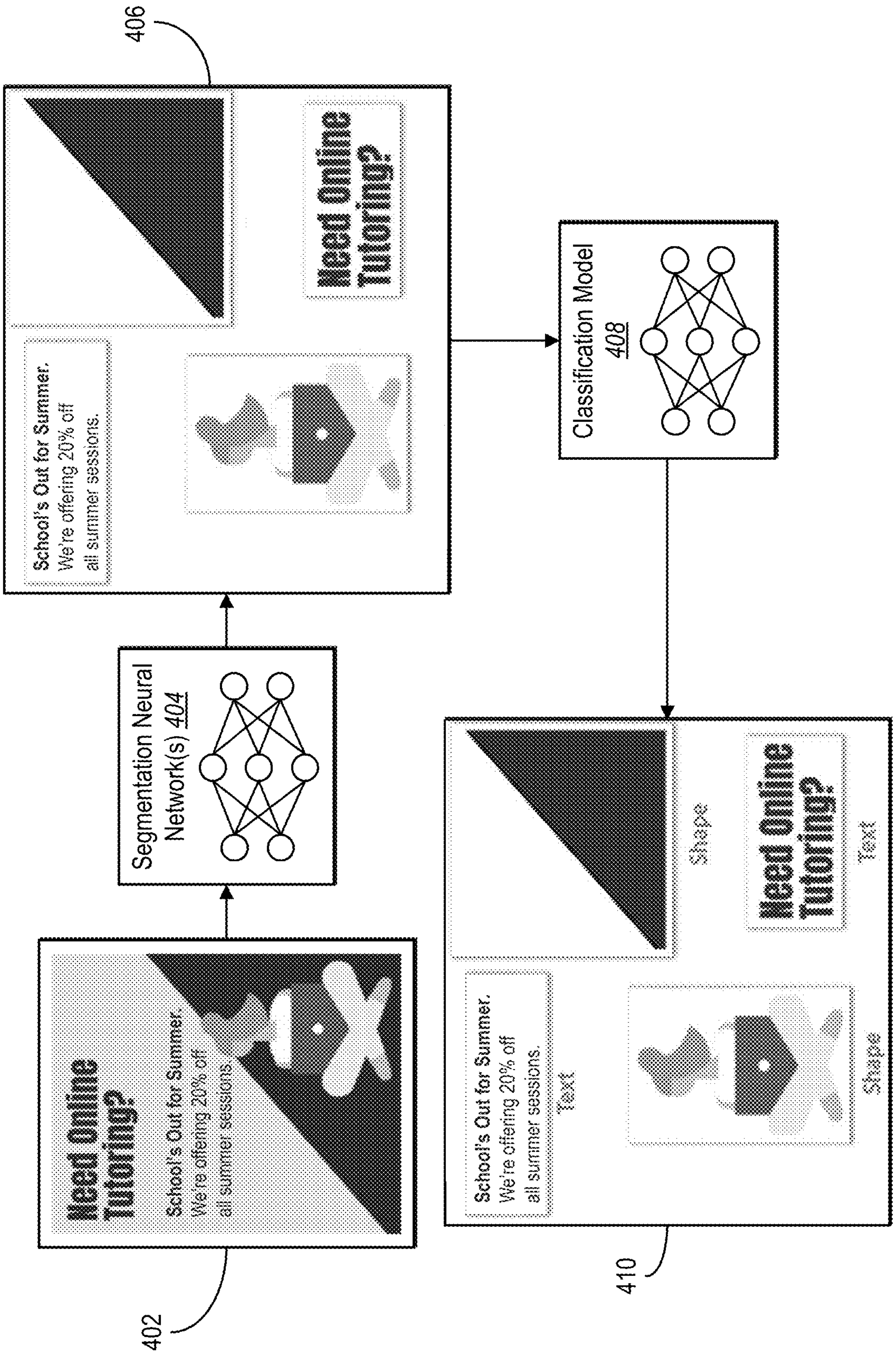
FIG. 4 illustrates the image decomposing system generating segmentation masks and classifying the segmentation masks in accordance with one or more embodiments.

Specifically, FIG. 4 shows the image decomposing system 102 obtaining a digital image 402 that includes design elements. Furthermore, FIG. 4 shows the image decomposing system 102 processing the digital image 402 through a plurality of segmentation neural networks 404 to determine segmentation masks 406 from the digital image 402. Moreover, FIG. 4 shows the image decomposing system 102 processing the segmentation masks 406 through classification model 408 to determine design element classifications 410 for the digital image 402.

In some embodiments, the image decomposing system 102 classifies design elements as shapes, text, frames, or backgrounds. Alternatively, in some embodiments, the image decomposing system 102 classifies design elements as shapes, text, or backgrounds/frames. Moreover, in some embodiments, the image decomposing system 102 utilizes additional design element types (e.g., additionally, or alternatively, to shape, text, frame, and background), such as color, line, texture, space, size, form, and/or pattern.

In some implementations, the image decomposing system 102 utilizes k-nearest neighbor (KNN) classification in the classification model 408. To illustrate, the image decomposing system 102 utilizes the segmentation neural network(s) 404 to generate an embedding for a design element of the digital image 402. The image decomposing system 102 then assigns a class to the embedding by performing majority (or plurality) matching over the embedding's k nearest neighbors in the embedding space. For instance, the image decomposing system 102 calculates distances between the embedding for the design element and other embeddings for design elements. For a k value of ten, the image decomposing system 102 considers the embeddings corresponding to the ten shortest distances, and determines the most common design element classification among those ten embeddings. The image decomposing system 102 assigns that classification to the design element represented by the embedding being considered.

In some embodiments, the image decomposing system 102 trains the classification model 408 to determine the classifications utilizing a large (e.g., two thousand) set of representative embeddings per class. The image decomposing system 102 obtains the representative embeddings by averaging multimask output embeddings of the segmentation neural network(s) 404 for each class within a design.

As mentioned, in some implementations, the image decomposing system 102 determines a design element classification for each segmentation mask of the digital image 402. Each design element classification indicates a type of design element for the corresponding segmentation mask. For example, the design element classification is a background element classification, a frame element classification, a shape element classification, or a text element classification (or a classification corresponding to a different design element type). In some embodiments, each of the resulting layers generated by the image decomposing system 102 has a single classification (e.g., a particular layer has design elements that all correspond to a text element classification).

As discussed, in some embodiments, the image decomposing system 102 utilizes a plurality of segmentation neural networks to generate segmentation masks for a digital image. For instance, FIG. 5 illustrates the image decomposing system 102 utilizing three different segmentation neural networks to determine segmentations for design elements in layers of a digital image in accordance with one or more embodiments.

Figure 5:
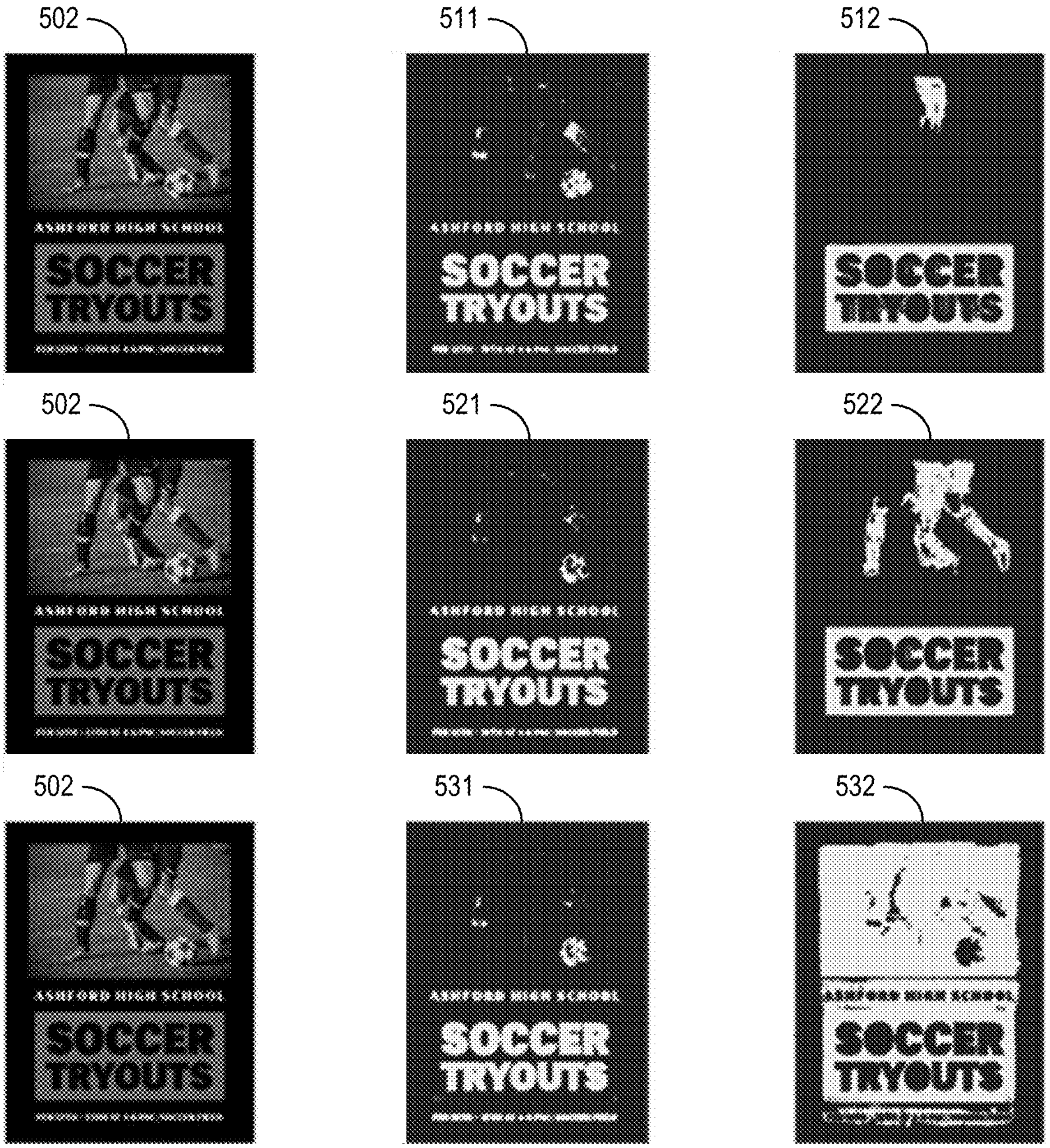
FIG. 5 illustrates the image decomposing system generating segmentations for design elements in layers of a digital image utilizing three different segmentation neural networks in accordance with one or more embodiments.

Specifically, FIG. 5 shows the image decomposing system 102 obtaining a digital image 502 that contains design elements. The image decomposing system 102 utilizes a first segmentation neural network (e.g., a naïve layer segmentation neural network) to determine a first set of layer masks for design elements corresponding to different depths of the digital image 502. For example, the image decomposing system 102 utilizes the first segmentation neural network to generate a layer mask 511 for a first layer of the digital image 502 and a layer mask 512 for a second layer of the digital image 502. As shown in the example of FIG. 5, the image decomposing system 102 determines the first layer mask 511 for text elements of the design of digital image 502 at a first depth, and the second layer mask 512 for a shape element of the design of digital image 502 at a second depth.

As just mentioned, in some embodiments, the image decomposing system 102 utilizes a naïve layer segmentation neural network. In particular, the image decomposing system 102 utilizes the naïve layer segmentation neural network to determine a predetermined number of layers of design elements for the digital image. In some embodiments, the image decomposing system 102 develops the naïve layer segmentation neural network by expanding the multimask outputs of a segmentation neural network so that the mask decoder can output a predetermined number (e.g., five) of low-resolution masks corresponding to different depths. In some embodiments, the image decomposing system 102 trains the naïve layer segmentation neural network to predict layers by applying a dice focal loss on each of the multimask outputs of the segmentation neural network and adding them together.

Additionally, as shown in FIG. 5, in some embodiments, the image decomposing system 102 utilizes a second segmentation neural network (e.g., an attention-modulated layer segmentation neural network) to determine a second set of layer masks for the design elements corresponding to the different depths of the digital image 502. For example, the image decomposing system 102 utilizes the second segmentation neural network to generate a layer mask 521 for the first layer of the digital image 502 and a layer mask 522 for the second layer of the digital image 502. As shown in the example of FIG. 5, the image decomposing system 102 determines the layer mask 521 for text elements of the design of digital image 502, and the layer mask 522 for a shape element of the design of digital image 502.

As just mentioned, in some embodiments, the image decomposing system 102 utilizes an attention-modulated layer segmentation neural network. In particular, the image decomposing system 102 utilizes the attention-modulated layer segmentation neural network to determine an order of layers for the set of layer masks. In particular, the image decomposing system 102 modulates an attention block of a mask decoder of the attention-modulated layer segmentation neural network. For example, the image decomposing system 102 trains the attention-modulated layer segmentation neural network to modulate attention blocks of the mask decoder to localize segments of interest corresponding to query prompts for digital images. To illustrate, given a prompt and an image, the image decomposing system 102 utilizes the attention-modulated layer segmentation neural network to localize segments of interest by extracting query projections from cross-image-to-token attention blocks of transformer blocks and add them element-wise to image tokens before they undergo convolutional upscaling. In this way, the image decomposing system 102 shifts the course of loss backpropagation to the projection layers of the attention blocks.

Furthermore, as shown in FIG. 5, in some embodiments, the image decomposing system 102 utilizes a third segmentation neural network (e.g., a self-attention-and-cross-attention-modulated layer segmentation neural network) to determine a third set of layer masks for the design elements corresponding to the different depths of the digital image 502. For example, the image decomposing system 102 utilizes the third segmentation neural network to generate a layer mask 531 for the first layer of the digital image 502 and a layer mask 532 for the second layer of the digital image 502. As shown in the example of FIG. 5, the image decomposing system 102 determines the layer mask 531 for text elements of the design of digital image 502, and the layer mask 532 for a shape element and a background image of the design of digital image 502.

As just mentioned, in some embodiments, the image decomposing system 102 utilizes a self-attention-and-cross-attention-modulated layer segmentation neural network. In particular, the image decomposing system 102 utilizes the self-attention-and-cross-attention-modulated layer segmentation neural network to determine an order of layers for the set of layer masks. In particular, the image decomposing system 102 determines self-attention for an image embedding of the digital image prior to determining cross-token-to-image attention for the image embedding.

More particularly, in some embodiments, the image decomposing system 102 processes prompt tokens through a self-attention block and a cross-attention block (e.g., a token-to-image attention block), and updates the tokens using multilayer perceptrons. The multimask tokens are then spliced and projected to combine with the image embeddings to generate masks. The image decomposing system 102 utilizes the self-attention-and-cross-attention-modulated layer segmentation neural network to perform self-attention on the image embeddings prior to the cross-token-to-image attention of the transformer block. In this way, the image decomposing system 102 develops intuition about discrete depths amongst overlapping components.

As mentioned, in some implementations, the image decomposing system 102 utilizes more than one segmentation neural network to determine layer masks for a digital image. For example, the image decomposing system 102 combines the outputs of a plurality of segmentation neural networks. To illustrate, the image decomposing system 102 combines the sets of layers of design elements generated by the plurality of segmentation neural networks into a single set of layer masks. For instance, in some implementations, the image decomposing system 102 determines averages for the segmentation masks across each corresponding layer in the sets of layers. To illustrate, the image decomposing system 102 determines a first combined segmentation mask for a first depth by averaging the layer mask 511, the layer mask 521, and the layer mask 531 and a second combined segmentation mask for a second depth by averaging the layer mask 512, the layer mask 522, and the layer mask 532. Additionally, as mentioned, the image decomposing system 102 generates bounding boxes from the combined segmentation masks to provide as prompts to a fine-tuned segmentation neural network.

As discussed, in some embodiments, the image decomposing system 102 utilizes a fine-tuned segmentation neural network to generate or refine segmentation masks for digital images. For instance, FIG. 6 illustrates a comparison of segmentation masks from a segmentation neural network before and after finetuning, in accordance with one or more embodiments.

Figure 6:
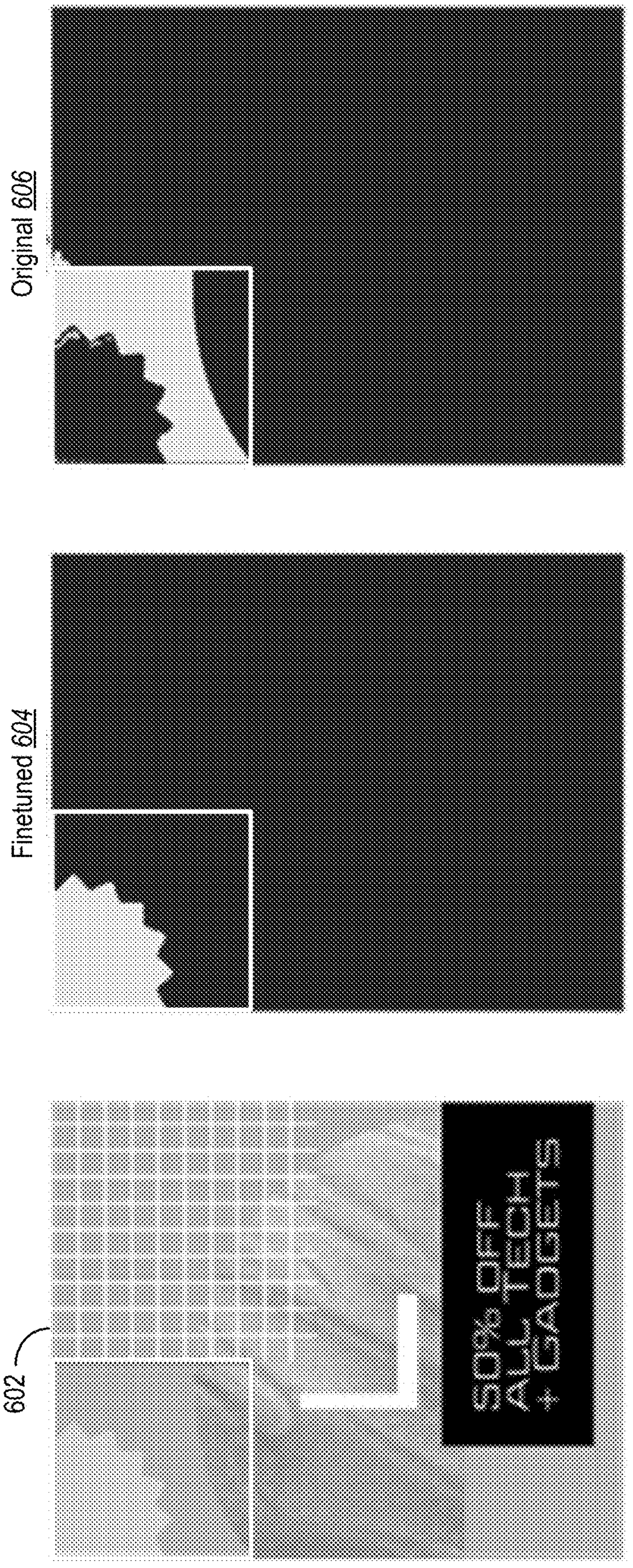
FIG. 6 illustrates a comparison of segmentation masks from a segmentation neural network before and after fine-tuning in accordance with one or more embodiments.

Specifically, FIG. 6 shows a digital image 602 comprising design elements. Additionally, FIG. 6 shows a bounding box (e.g., a prompt) around a design element (e.g., a shape element) in the upper left-hand corner of the digital image 602. Furthermore, FIG. 6 shows a finetuned segmentation mask 604 and an original segmentation mask 606. In particular, the original segmentation mask 606 was generated utilizing a segmentation neural network without finetuning on design elements. By contrast, the image decomposing system 102 generated the finetuned segmentation mask 604 utilizing a fine-tuned segmentation neural network. As apparent from the finetuned segmentation mask 604, the image decomposing system 102 provides more accurate segmentation (e.g., as compared to utilizing a segmentation neural network without finetuning) by utilizing the fine-tuned segmentation neural network. For instance, the fine-tuned segmentation mask 604 correctly segments the design element that is the subject of the bounding box.

More particularly, in some implementations, the image decomposing system 102 generates segmentation masks for digital images by determining bounding boxes for layer masks within the set of layers of design elements, and generates the segmentation masks for the design elements from the bounding boxes utilizing a fine-tuned segmentation neural network.

To further illustrate, in some implementations, the image decomposing system 102 finetunes a segmentation neural network by training the segmentation neural network on design images with design elements. For instance, the image decomposing system 102 modifies parameters of the segmentation neural network utilizing a dice focal loss on a dataset of designs comprising various design elements. For example, the image decomposing system 102 generates the finetuned segmentation neural network by finetuning a segmentation neural network to differentiate between real-world images and design elements (e.g., text within an image, images as background elements in a design image, etc.).

Figure 8:
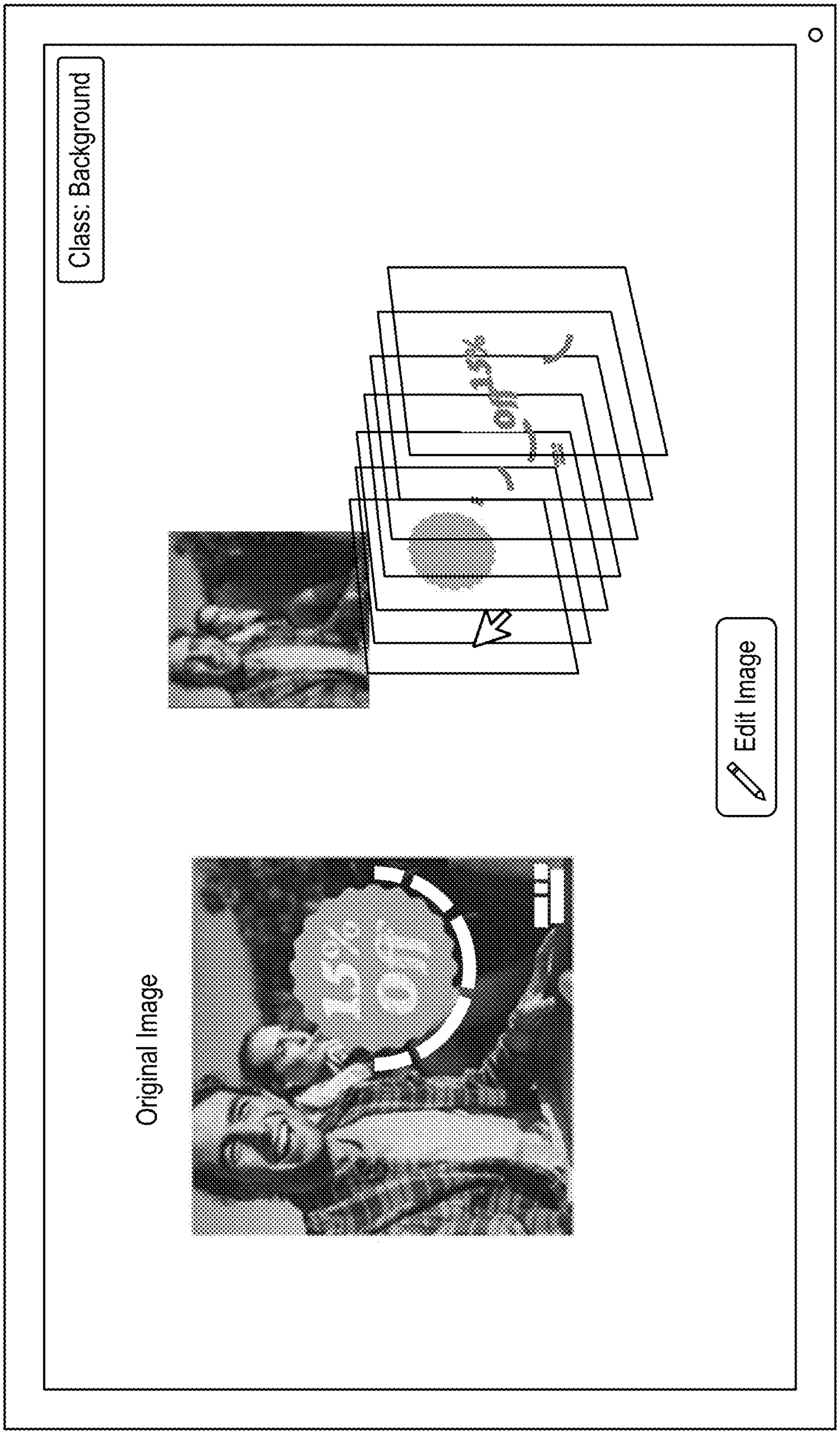
FIG. 8 illustrates the image decomposing system providing a digital image and design elements from the digital image in a set of layers for display in a graphical user interface in accordance with one or more embodiments.
Figure 9:
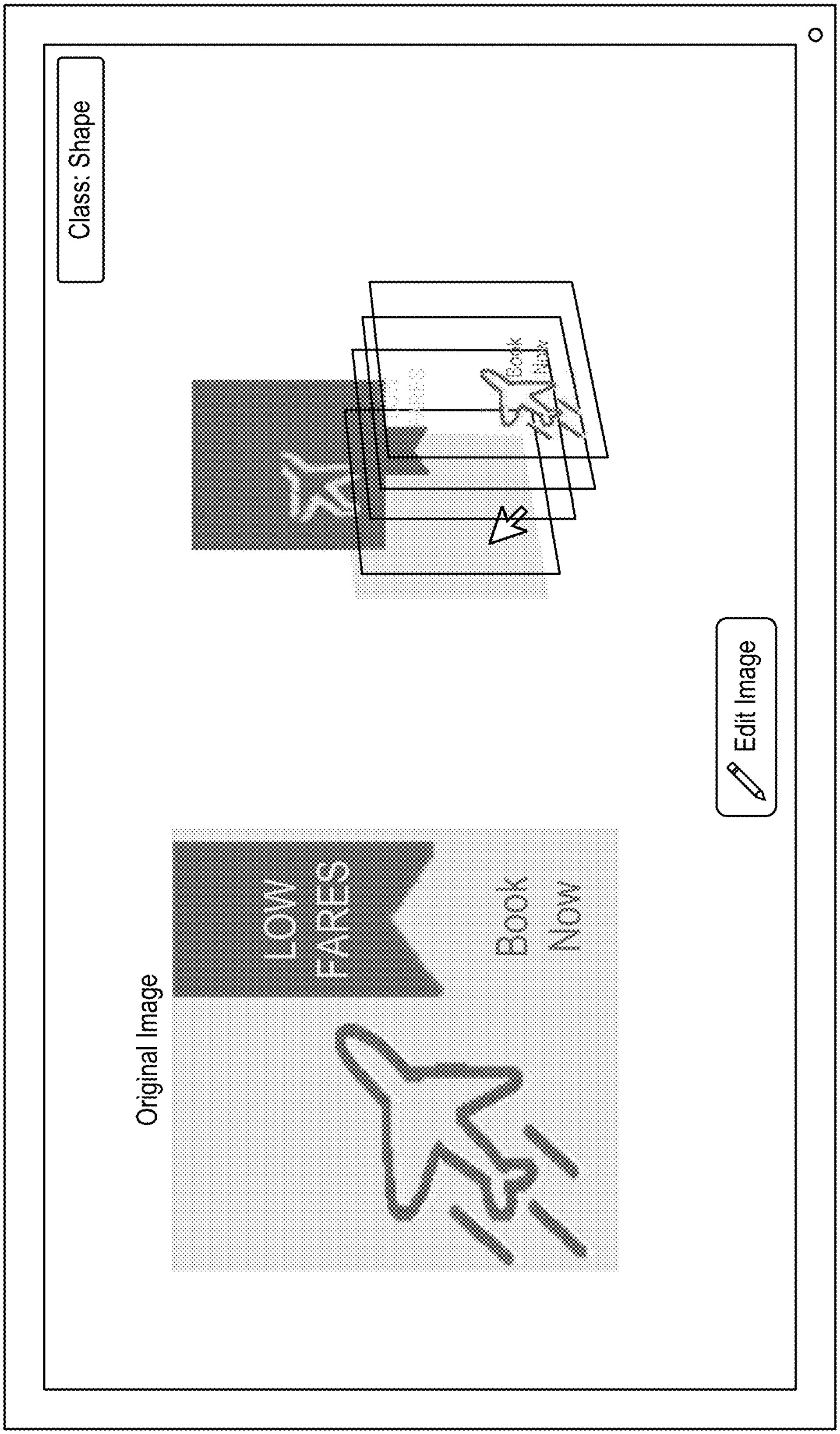
FIG. 9 illustrates the image decomposing system providing a digital image and design elements from the digital image in a set of layers for display in a graphical user interface in accordance with one or more embodiments.

As discussed, in some embodiments, the image decomposing system 102 provides a digital image with layers of design elements at different depths for display via a graphical user interface of a client device. For instance, FIGS. 7-9 illustrate the image decomposing system 102 providing digital images and design elements in sets of layers for display in a graphical user interface in accordance with one or more embodiments.

Figure 7:
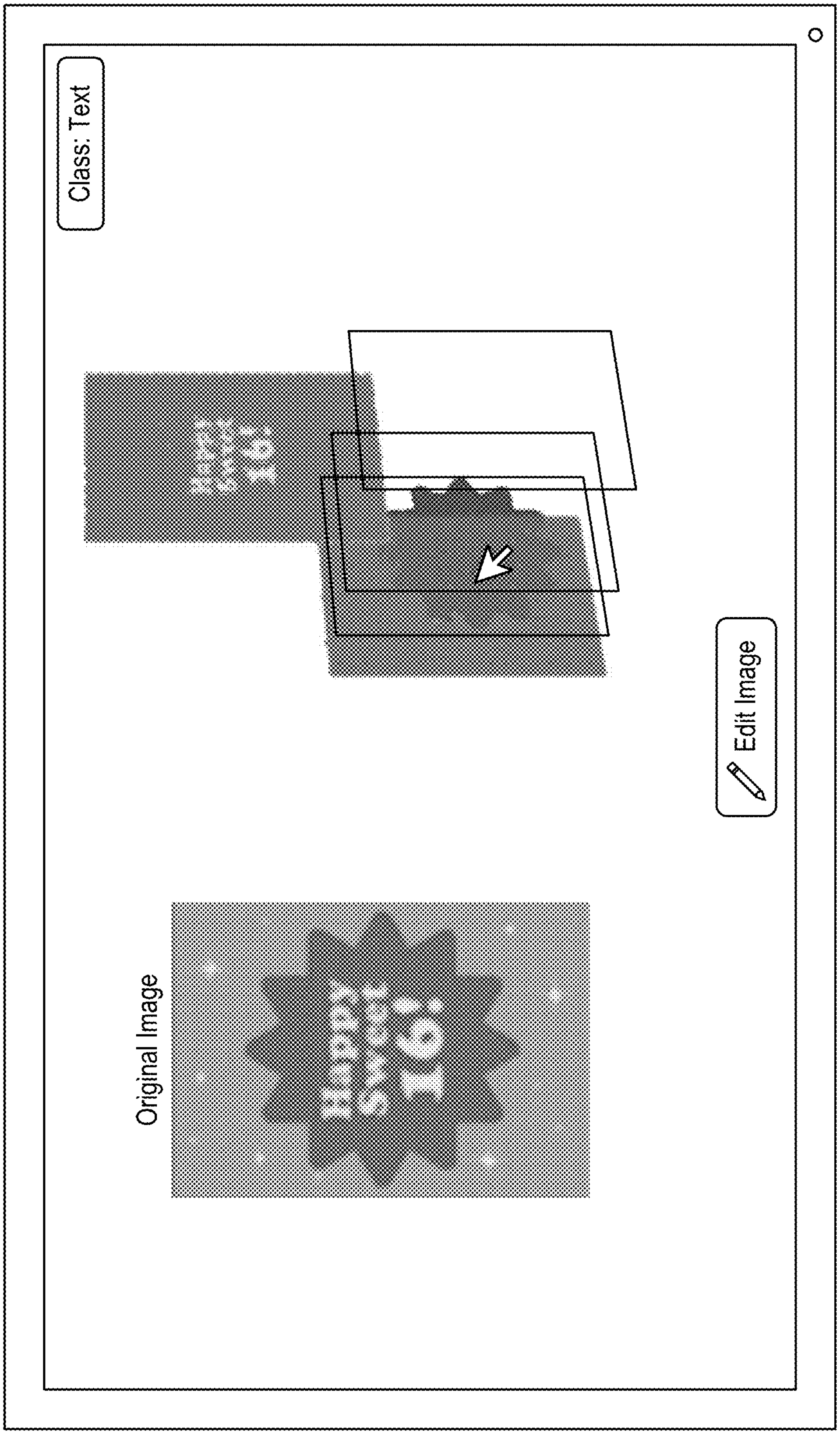
FIG. 7 illustrates the image decomposing system providing a digital image and design elements from the digital image in a set of layers for display in a graphical user interface in accordance with one or more embodiments.

Specifically, FIG. 7 shows the image decomposing system 102 providing, for display via a graphical user interface of a client device, a digital image (original image) and design elements within a set of layers according to segmentation masks. For instance, as shown in FIG. 7, the image decomposing system 102 determines layers of a digital image (e.g., a birthday card), generates segmentation masks for the digital image (e.g., segmenting text ("Happy Sweet 16!"), shape(s), and background, among other possible elements), and provides the layers for display via the graphical user interface. For example, the image decomposing system 102 provides the digital image with its corresponding layers at different depths for preview with an option to edit the digital image according to the indicated layers.

Furthermore, in some implementations, the image decomposing system 102 provides each layer of the set of layers for display via the graphical user interface as a selectable stack of layers of design elements. For example, the image decomposing system 102 provides the layers for display such that a user selection of a layer highlights, flags, or otherwise calls attention to the layer. For instance, upon a cursor hovering over the layer with the text "Happy Sweet 16!", the image decomposing system 102 raises that layer in the graphical user interface to draw attention to that layer.

In addition, as mentioned, in some embodiments, the image decomposing system 102 inpaints gaps in lower layers leftover from segmenting design elements from higher layers of the digital image. Furthermore, in some implementations, the image decomposing system 102 provides the inpainted layers for display via the graphical user interface in the stack of layers of design elements from the digital image. For example, as shown in FIG. 7, the star-burst shape is inpainted where the text "Happy Sweet 16!" had been over the star-burst shape.

Moreover, in some embodiments, the image decomposing system 102 provides the design elements within the set of layers for display according to design element classifications. For example, the image decomposing system 102 determines a design element classification for each layer of non-overlapping design elements, and provides the design element classifications with the layers. For instance, as shown in FIG. 7, the image decomposing system 102 provides an indication that the layer with the text "Happy Sweet 16!" has a text element classification.

Similarly, FIG. 8 shows the image decomposing system 102 providing, for display via a graphical user interface of a client device, a digital image (original image) and design elements within a set of layers according to segmentation masks and design element classifications. As shown in FIG. 8, the image decomposing system 102 segments text elements, shape elements, and background elements to decompose the original image. Moreover, the image decomposing system 102 provides the design elements for display in a selectable stack. In the example of FIG. 8, upon a selection of a background image (e.g., the lowest layer in the set of layers), the image decomposing system 102 raises that layer in the graphical user interface to draw attention to that layer, and provides an indication that the layer has a design element classification of Background.

Similarly, FIG. 9 shows the image decomposing system 102 providing, for display via a graphical user interface of a client device, a digital image (original image) and design elements within a set of layers according to segmentation masks and design element classifications. As shown in FIG. 9, the image decomposing system 102 segments text elements, shape elements, and background elements to decompose the original image. Moreover, the image decomposing system 102 provides the design elements for display in a selectable stack. In the example of FIG. 9, a user selects (e.g., by hovering a cursor over) a layer with a shape element (e.g., an airplane shape). The image decomposing system 102 raises that layer in the graphical user interface to draw attention to that layer, and provides an indication that the layer has a design element classification of Shape.

The image decomposing system 102 was evaluated quantitatively against two existing segmentation models. The evaluation metric used was a dice focal loss. The following table shows experimental results of this evaluation. A lower value of dice focal loss indicates superior results. As seen in the table of quantitative results, the image decomposing system 102 outperforms both existing segmentation models, thereby enhancing accuracy of segmenting design elements in layers of a digital image.

| | Dice Focal Loss |
|---|---|
| Existing Segmentation Model 1 | 0.31 |
| Existing Segmentation Model 2 | 0.27 |
| Image Decomposing System 102 utilizing a fine-tuned segmentation neural network | 0.09 |

Figure 10:
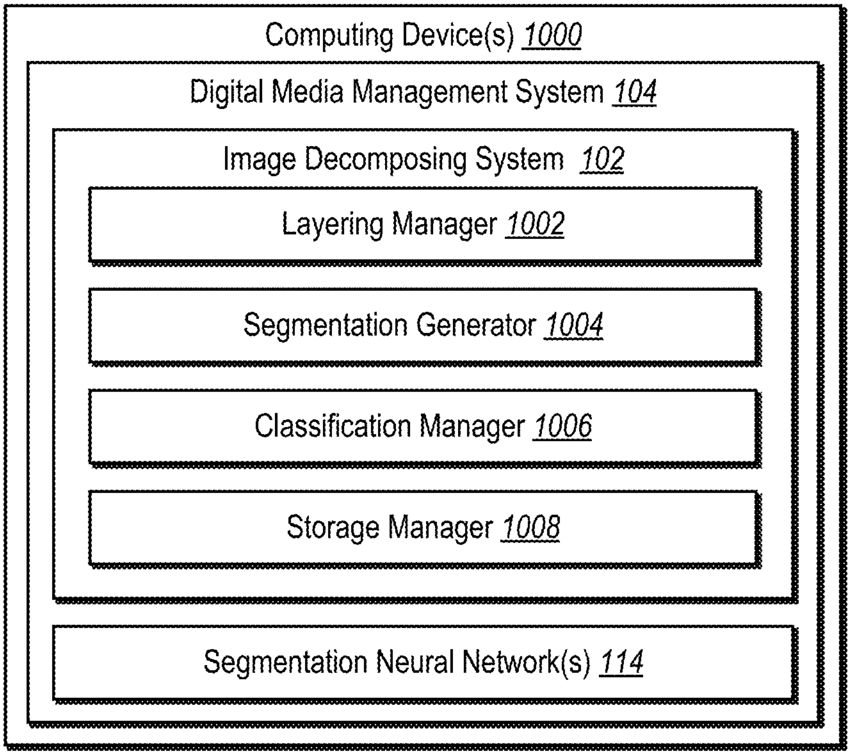
FIG. 10 illustrates a diagram of an example architecture of the image decomposing system in accordance with one or more embodiments.

Turning now to FIG. 10, additional detail will be provided regarding components and capabilities of one or more embodiments of the image decomposing system 102. In particular, FIG. 10 illustrates an example image decomposing system 102 executed by a computing device(s) 1000 (e.g., the server device(s) 106 or the client device 108). As shown by the embodiment of FIG. 10, the computing device(s) 1000 includes or hosts the digital media management system 104 and/or the image decomposing system 102. Furthermore, as shown in FIG. 10, the image decomposing system 102 includes a layering manager 1002, a segmentation generator 1004, a classification manager 1006, and a storage manager 1008.

As shown in FIG. 10, the image decomposing system 102 includes a layering manager 1002. In some implementations, the layering manager 1002 determines layers of design elements of digital images. For example, the layering manager 1002 utilizes segmentation neural networks to determine one or more sets of layers of design elements corresponding to different depths of a digital image. Moreover, in some embodiments, the layering manager 1002 determines layer masks for the design elements corresponding to the different depths of a digital image.

Moreover, as shown in FIG. 10, the image decomposing system 102 includes a segmentation generator 1004. In some implementations, the segmentation generator 1004 generates segmentation masks for digital images. For instance, the segmentation generator 1004 utilizes segmentation neural networks to decompose a digital image into design elements within a set of layers. Furthermore, in some implementations, the segmentation generator 1004 utilizes a fine-tuned segmentation neural network to generate segmentation masks from the layer masks determined by the layering manager 1002. In some embodiments, the segmentation generator 1004 generates the segmentation masks based on bounding box prompts for the set of layer masks. Moreover, in some embodiments, the segmentation generator trains the fine-tuned segmentation neural network to generate segmentation masks for design elements within digital images.

Furthermore, as shown in FIG. 10, the image decomposing system 102 includes a classification manager 1006. In some implementations, the classification manager 1006 determines design element classifications for segmentation masks. To illustrate, the classification manager 1006 determines, for each segmentation mask, a type of design element. For instance, the classification manager 1006 determines a background element classification, a frame element classification, a shape element classification, a text element classification, or another type of design element classification for each segmentation mask.

Additionally, as shown in FIG. 10, the image decomposing system 102 includes a storage manager 1008. In some implementations, the storage manager 1008 stores information (e.g., via one or more memory devices) on behalf of the image decomposing system 102. For example, the storage manager 1008 stores parameters of one or more segmentation neural network, including layer segmentation neural networks and/or fine-tuned segmentation neural networks. Moreover, in some implementations, the storage manager 1008 stores digital images, layer masks, segmentation masks, and/or inpainted layers for the digital images.

Each of the components 1002-1008 of the image decomposing system 102 includes software, hardware, or both. For example, the components 1002-1008 include one or more instructions stored on a computer-readable storage medium and executable by processors of one or more computing devices, such as a client device or server device. When executed by the one or more processors, in some implementations, the computer-executable instructions of the image decomposing system 102 cause the computing device(s) to perform the methods described herein. Alternatively, in one or more implementations, the components 1002-1008 include hardware, such as a special purpose processing device to perform a certain function or group of functions. Alternatively, in some implementations, the components 1002-1008 of the image decomposing system 102 include a combination of computer-executable instructions and hardware.

Furthermore, the components 1002-1008 of the image decomposing system 102 are, for example, implemented as one or more operating systems, as one or more stand-alone applications, as one or more modules of an application, as one or more plug-ins, as one or more library functions, as one or more functions callable by other applications, and/or as a cloud-computing model. Thus, in some implementations, the components 1002-1008 are implemented as a stand-alone application, such as a desktop or mobile application. Furthermore, in various implementations, the components 1002-1008 are implemented as one or more web-based applications hosted on a remote server. In some implementations, the components 1002-1008 are implemented in a suite of mobile device applications or "apps." To illustrate, in some implementations, the components 1002-1008 are implemented in an application, including but not limited to Adobe Creative Cloud, Adobe Express, Adobe Firefly, and Adobe InDesign. The foregoing are either registered trademarks or trademarks of Adobe in the United States and/or other countries.

Figure 11:
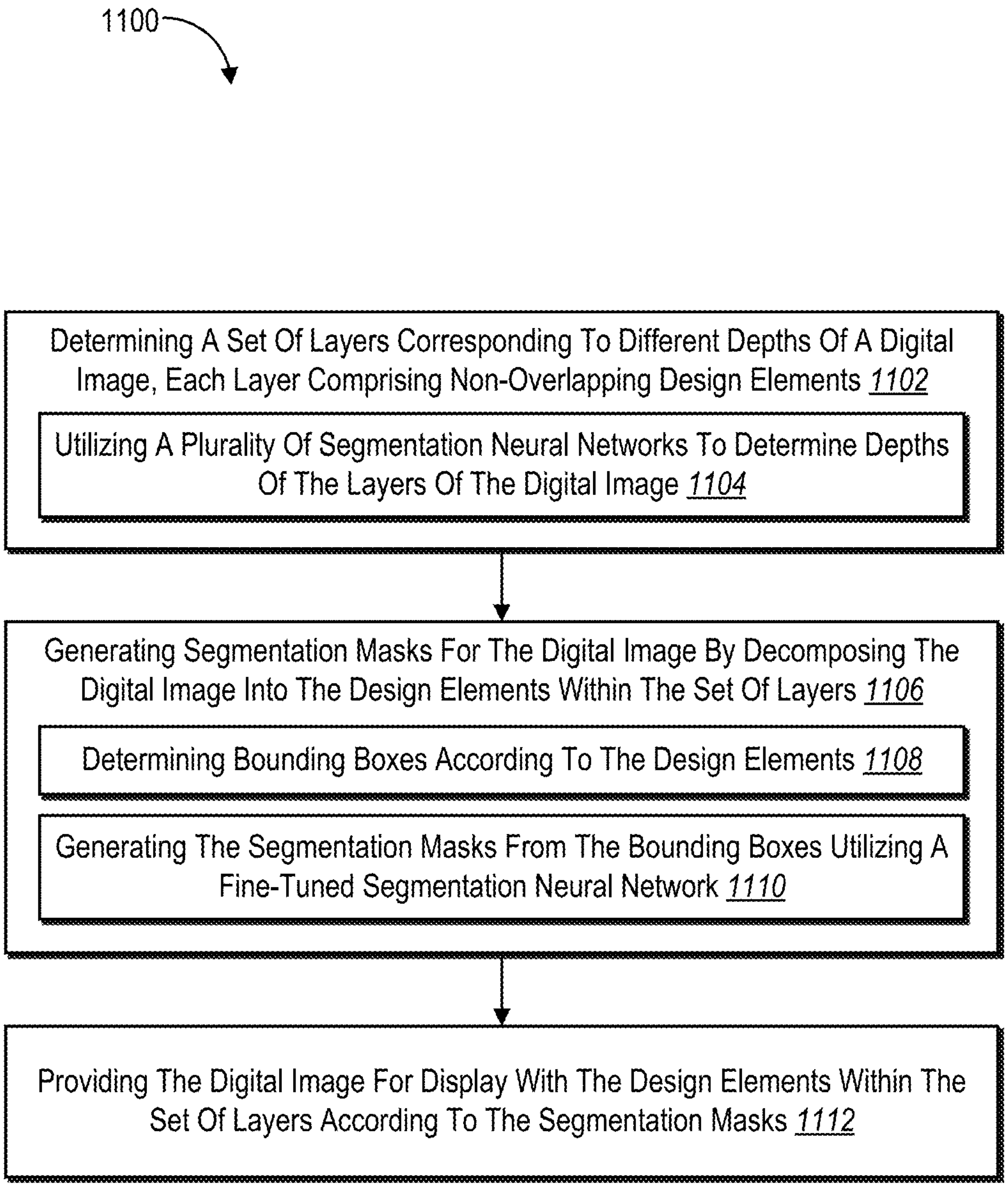
FIG. 11 illustrates a flowchart of a series of acts for decomposing a raster image into constituent design elements in accordance with one or more embodiments.

FIGS. 1-10, the corresponding text, and the examples provide a number of different methods, systems, devices, and non-transitory computer-readable media of the image decomposing system 102. In addition to the foregoing, one or more embodiments are described in terms of flowcharts comprising acts for accomplishing a particular result, as shown in FIG. 11. In some implementations, the processes of the image decomposing system 102 are performed with more or fewer acts. Furthermore, in various implementations, the acts are performed in differing orders. Additionally, in some implementations, the acts described herein are repeated or performed in parallel with one another or in parallel with different instances of the same or similar acts.

As mentioned, FIG. 11 illustrates a flowchart of a series of acts 1100 for decomposing a digital image into constituent elements in accordance with one or more implementations. While FIG. 11 illustrates acts according to one implementation, alternative implementations omit, add to, reorder, and/or modify any of the acts shown in FIG. 11. In one or more implementations, the acts of FIG. 11 are performed as part of a method (e.g., a computer-implemented method). Alternatively, in one or more implementations, a non-transitory computer-readable storage medium comprises instructions that, when executed by one or more processors, cause a computing device to perform the acts of FIG. 11. In some implementations, a system performs the acts of FIG. 11.

As shown in FIG. 11, the series of acts 1100 includes an act 1102 of determining a set of layers corresponding to different depths of a digital image, each layer comprising non-overlapping design elements, an act 1104 of utilizing a plurality of segmentation neural networks to determine depths of the layers of the digital image, an act 1106 of generating segmentation masks for the digital image by decomposing the digital image into the design elements within the set of layers, an act 1108 of determining bounding boxes according to the design elements, an act 1110 of generating the segmentation masks from the bounding boxes utilizing a fine-tuned segmentation neural network, and an act 1112 of providing the digital image for display with the design elements within the set of layers according to the segmentation masks.

In particular, in some implementations, the act 1102 includes determining, utilizing a plurality of segmentation neural networks, a set of layers corresponding to different depths of a digital image, each layer comprising non-overlapping design elements, the act 1104 includes utilizing a plurality of segmentation neural networks to determine depths of each layer within the set of layers of the digital image, the act 1106 includes generating, utilizing the plurality of segmentation neural networks, segmentation masks for the digital image by decomposing the digital image into the design elements within the set of layers, the act 1108 includes determining bounding boxes for the set of layers according to the design elements, the act 1110 includes generating, from the bounding boxes utilizing a fine-tuned segmentation neural network, segmentation masks for the design elements within the set of layers, and the act 1112 includes providing, for display via a graphical user interface of a client device, the digital image with the design elements within the set of layers according to the segmentation masks.

For example, in some implementations, the series of acts 1100 includes determining the set of layers by determining a predetermined number of layers of design elements for the digital image utilizing a first layering segmentation neural network. Moreover, in some implementations, the series of acts 1100 includes determining the set of layers by determining an order for the predetermined number of layers utilizing a second layering segmentation neural network trained to modulate attention blocks of a mask decoder of the plurality of segmentation neural networks to localize segments of interest corresponding to query prompts for digital images. Furthermore, in some implementations, the series of acts 1100 includes determining the set of layers by determining the order for the predetermined number of layers utilizing a third layering segmentation neural network that determines self-attention for an image embedding of the digital image prior to cross-token-to-image attention for the image embedding.

Additionally, in some implementations, the series of acts 1100 includes generating the segmentation masks for the digital image by: determining bounding boxes for layer masks within the set of layers of design elements; and generating the segmentation masks for the design elements from the bounding boxes utilizing a fine-tuned segmentation neural network. Moreover, in some implementations, the series of acts 1100 includes determining, for each segmentation mask of the segmentation masks, a design element classification indicating a type of design element corresponding to the segmentation mask. Furthermore, in some implementations, the series of acts 1100 includes inpainting a region of a layer of the set of layers, the region corresponding to a segmentation mask on the layer of the set of layers.

In addition, in some implementations, the series of acts 1100 includes generating, utilizing a plurality of segmentation neural networks, segmentation masks for a digital image by decomposing the digital image into design elements within a set of layers corresponding to different depths of a digital image; determining, for each segmentation mask of the segmentation masks, a design element classification indicating a type of design element corresponding to the segmentation mask; and providing, for display via a graphical user interface of a client device, the digital image with the design elements within the set of layers according to the segmentation masks and the design element classifications.

For example, in some implementations, the series of acts 1100 includes generating the segmentation masks by determining, utilizing a plurality of layering segmentation neural networks of the plurality of segmentation neural networks, a plurality of sets of a predetermined number of layers of design elements in the set of layers. Moreover, in some implementations, the series of acts 1100 includes combining the plurality of sets of the predetermined number of layers of design elements generated by the plurality of layering segmentation neural networks into the set of layers. Furthermore, in some implementations, the series of acts 1100 includes determining, for each segmentation mask, the design element classification by determining at least one of a background element classification, a frame element classification, a shape element classification, or a text element classification.

Additionally, in some implementations, the series of acts 1100 includes generating the segmentation masks for the digital image by: determining bounding boxes for the design elements; and generating the segmentation masks for the design elements from the bounding boxes utilizing a fine-tuned segmentation neural network of the plurality of segmentation neural networks. Moreover, in some implementations, the series of acts 1100 includes sequentially inpainting regions of the digital image corresponding to the segmentation masks according to an order of layers of the set of layers. Furthermore, in some implementations, the series of acts 1100 includes providing the digital image with the design elements within the set of layers by providing each layer of the set of layers for display via the graphical user interface as a selectable stack of layers of design elements.

In addition, in some implementations, the series of acts 1100 includes determining, utilizing a plurality of layer segmentation neural networks, a set of layer masks for design elements corresponding to different depths of a digital image; determining bounding boxes for the set of layer masks according to the design elements; generating, from the bounding boxes utilizing a fine-tuned segmentation neural network, segmentation masks for the design elements within a set of layers corresponding to the set of layer masks; and providing, for display via a graphical user interface of a client device, the digital image with the segmentation masks at the different depths of the digital image.

For example, in some implementations, the series of acts 1100 includes determining the set of layer masks for the design elements by: utilizing a first layering segmentation neural network to determine a predetermined number of layers of design elements for the digital image; and utilizing a second layering segmentation neural network to determine an order of layers for the set of layer masks by modulating an attention block of a mask decoder of the second layering segmentation neural network. Moreover, in some implementations, the series of acts 1100 includes determining the set of layer masks for the design elements by: utilizing a first layering segmentation neural network to determine a predetermined number of layers of design elements for the digital image; and utilizing a second layering segmentation neural network to determine an order of layers for the set of layer masks by determining self-attention for an image embedding of the digital image prior to determining cross-token-to-image attention for the image embedding.

Furthermore, in some implementations, the series of acts 1100 includes determining the set of layer masks for the design elements by: utilizing a first layering segmentation neural network to determine a first set of layers of design elements for the digital image; utilizing a second layering segmentation neural network to determine a second set of layers by modulating an attention block of a mask decoder of the second layering segmentation neural network; utilizing a third layering segmentation neural network to determine a third set of layers by determining self-attention for an image embedding of the digital image prior to determining cross-token-to-image attention for the image embedding; and combining the first set of layers, the second set of layers, and the third set of layers into the set of layer masks.

Additionally, in some implementations, the series of acts 1100 includes determining, for each segmentation mask of the segmentation masks, a design element classification indicating a type of design element of a corresponding layer of the set of layer masks. Moreover, in some implementations, the series of acts 1100 includes providing the digital image with the segmentation masks at the different depths by providing inpainted layers for display via the graphical user interface in a stack of layers of design elements from the digital image.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
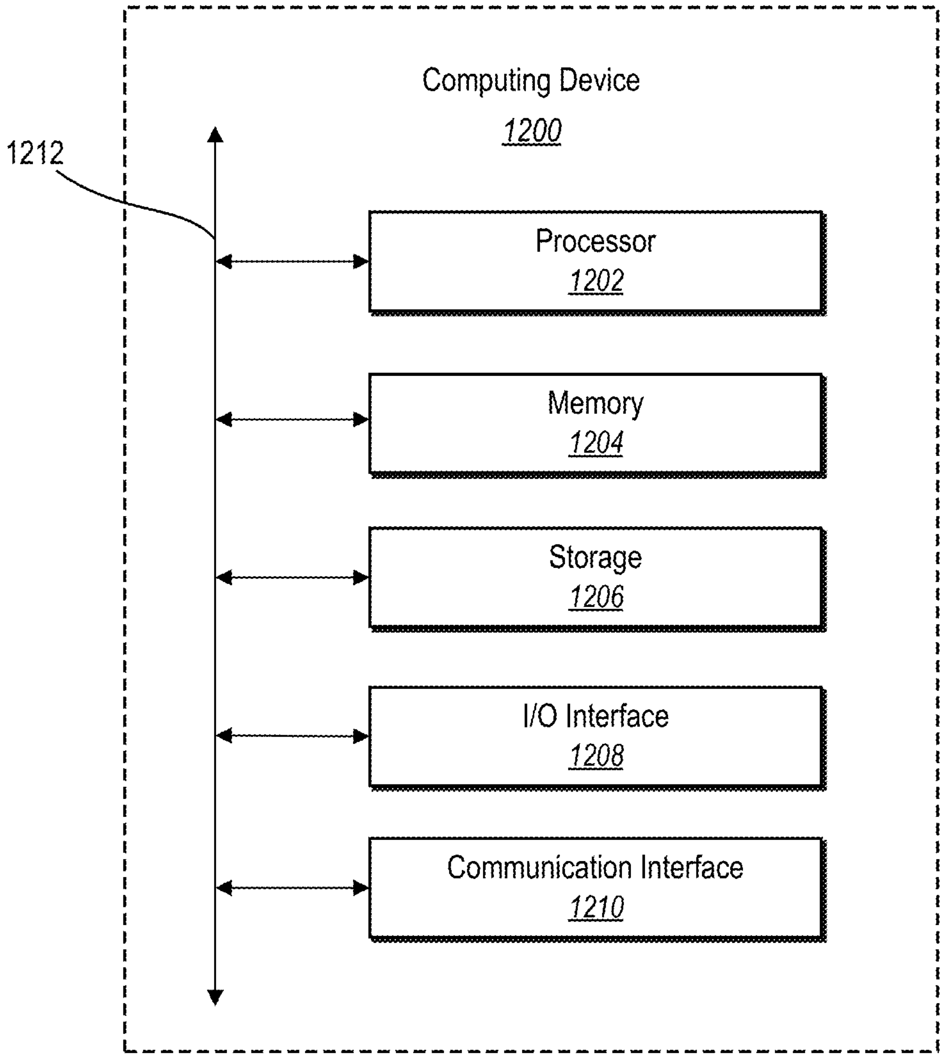
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200, may represent the computing devices described above (e.g., the computing device(s) 1000, the server device(s) 106, or the client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes the memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes the storage device 1206 for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include the bus 1212. The bus 1212 can include hardware, software, or both that connects components of computing device 1200 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, utilizing a plurality of segmentation neural networks, a set of layers corresponding to different depths of a digital image, the set of layers comprising a determined order based on design element depths, wherein a layer of the set of layers comprises a composite element including a plurality of objects detected at a single depth in relation to other design elements of the digital image;

generating, utilizing the plurality of segmentation neural networks, segmentation masks for the set of layers of the digital image by:

decomposing the digital image into design elements within the set of layers; and generating a single segmentation mask for the layer of the set of layers comprising the plurality of objects detected at the single depth in relation to the other design elements of the digital image; and providing, for display via a graphical user interface of a client device, the digital image with the design elements within the set of layers at the different depths according to the segmentation masks.

2. The computer-implemented method of claim 1, wherein determining the set of layers comprises determining a predetermined number of layers of design elements for the digital image utilizing a first layering segmentation neural network.

3. The computer-implemented method of claim 2, wherein determining the set of layers comprises determining an order for the predetermined number of layers utilizing a second layering segmentation neural network trained to modulate attention blocks of a mask decoder of the plurality of segmentation neural networks to localize segments of interest corresponding to query prompts for digital images.

4. The computer-implemented method of claim 3, wherein determining the set of layers comprises determining the order for the predetermined number of layers utilizing a third layering segmentation neural network that determines self-attention for an image embedding of the digital image prior to cross-token-to-image attention for the image embedding.

5. The computer-implemented method of claim 1, wherein generating the segmentation masks for the digital image comprises:

determining bounding boxes for layer masks within the set of layers of design elements; and generating the segmentation masks for the design elements from the bounding boxes utilizing a fine-tuned segmentation neural network.

6. The computer-implemented method of claim 1, further comprising determining, for each segmentation mask of the segmentation masks, a design element classification indicating a type of design element corresponding to the segmentation mask.

7. The computer-implemented method of claim 1, further comprising inpainting a region of a masked layer of the set of layers, the region corresponding to a segmentation mask on the masked layer of the set of layers.

8. A system comprising:

one or more memory devices comprising a plurality of segmentation neural networks; and one or more processors configured to cause the system to:

generate, utilizing the plurality of segmentation neural networks, segmentation masks for a set of layers of a digital image by:

decomposing the digital image into design elements within the set of layers corresponding to different depths of the digital image, the set of layers comprising a determined order based on design element depths, wherein a layer of the set of layers comprises a composite element including a plurality of objects detected at a single depth in relation to other design elements of the digital image; and generating a single segmentation mask for the layer of the set of layers comprising the plurality of objects detected at the single depth in relation to the other design elements of the digital image;

determine, for each segmentation mask of the segmentation masks, a design element classification indicating a type of design element corresponding to the segmentation mask; and provide, for display via a graphical user interface of a client device, the digital image with the design elements within the set of layers at the different depths according to the segmentation masks and corresponding design element classifications.

9. The system of claim 8, wherein the one or more processors are configured to cause the system to generate the segmentation masks by determining, utilizing a plurality of layering segmentation neural networks of the plurality of segmentation neural networks, a plurality of sets of a predetermined number of layers of design elements in the set of layers.

10. The system of claim 9, wherein the one or more processors are configured to cause the system to combine the plurality of sets of the predetermined number of layers of design elements generated by the plurality of layering segmentation neural networks into the set of layers.

11. The system of claim 8, wherein the one or more processors are configured to cause the system to determine, for each segmentation mask, the design element classification by determining at least one of a background element classification, a frame element classification, a shape element classification, or a text element classification.

12. The system of claim 8, wherein the one or more processors are configured to cause the system to generate the segmentation masks for the digital image by:

determining bounding boxes for the design elements; and generating the segmentation masks for the design elements from the bounding boxes utilizing a fine-tuned segmentation neural network of the plurality of segmentation neural networks.

13. The system of claim 8, wherein the one or more processors are configured to cause the system to sequentially inpaint regions of the digital image corresponding to the segmentation masks according to an order of layers of the set of layers.

14. The system of claim 8, wherein the one or more processors are configured to cause the system to provide the digital image with the design elements within the set of layers by providing each layer of the set of layers for display via the graphical user interface as a selectable stack of layers of design elements.

15. A non-transitory computer-readable medium storing executable instructions that, when executed by a processing device, cause the processing device to perform operations comprising:

determining, utilizing a plurality of layer segmentation neural networks, a set of layer masks for design elements corresponding to different depths of a digital image, the set of layer masks comprising a determined order based on design element depths, wherein a layer mask of the set of layer masks comprises a composite element mask including a plurality of objects detected at a single depth in relation to other design elements of the digital image;

determining bounding boxes for the set of layer masks according to the design elements;

generating, from the bounding boxes utilizing a fine-tuned segmentation neural network, segmentation masks for the design elements within a set of layers corresponding to the set of layer masks by generating a single segmentation mask for a layer of the set of layers corresponding to the layer mask comprising the plurality of objects detected at the single depth in relation to the other design elements of the digital image; and providing, for display via a graphical user interface of a client device, the digital image with the design elements within the set of layers at the different depths according to the segmentation masks.

16. The non-transitory computer-readable medium of claim 15, wherein determining the set of layer masks for the design elements comprises:

utilizing a first layering segmentation neural network to determine a predetermined number of layers of design elements for the digital image; and utilizing a second layering segmentation neural network to determine the determined order of layers for the set of layer masks by modulating an attention block of a mask decoder of the second layering segmentation neural network.

17. The non-transitory computer-readable medium of claim 15, wherein determining the set of layer masks for the design elements comprises:

utilizing a first layering segmentation neural network to determine a predetermined number of layers of design elements for the digital image; and utilizing a second layering segmentation neural network to determine the determined order of layers for the set of layer masks by determining self-attention for an image embedding of the digital image prior to determining cross-token-to-image attention for the image embedding.

18. The non-transitory computer-readable medium of claim 15, wherein determining the set of layer masks for the design elements comprises:

utilizing a first layering segmentation neural network to determine a first set of layers of design elements for the digital image;

utilizing a second layering segmentation neural network to determine a second set of layers by modulating an attention block of a mask decoder of the second layering segmentation neural network;

utilizing a third layering segmentation neural network to determine a third set of layers by determining self-attention for an image embedding of the digital image prior to determining cross-token-to-image attention for the image embedding; and combining the first set of layers, the second set of layers, and the third set of layers into the set of layer masks.

19. The non-transitory computer-readable medium of claim 15, wherein the operations further comprise determining, for each segmentation mask of the segmentation masks, a design element classification indicating a type of design element of a corresponding layer of the set of layer masks.

20. The non-transitory computer-readable medium of claim 15, wherein providing the digital image with the segmentation masks at the different depths comprises providing inpainted layers for display via the graphical user interface in a stack of layers of design elements from the digital image.

* * * * *